United States Patent
Itabashi et al.

(10) Patent No.: US 9,143,041 B2
(45) Date of Patent: Sep. 22, 2015

(54) MAGNETIC CIRCUIT, POWER-SUPPLYING DEVICE AND POWER-RECEIVING DEVICE FOR NON-CONTACT CHARGING APPARATUS, AND NON-CONTACT CHARGING APPARATUS

(75) Inventors: Hiromitsu Itabashi, Tottori (JP); Yoshiyuki Moriyama, Tottori (JP)

(73) Assignee: HITACHI METALS, LTD., Tokyo (JP)

( * ) Notice: Subject to any disclaimer, the term of this patent is extended or adjusted under 35 U.S.C. 154(b) by 415 days.

(21) Appl. No.: 13/577,005

(22) PCT Filed: Feb. 7, 2011

(86) PCT No.: PCT/JP2011/052564
§ 371 (c)(1),
(2), (4) Date: Aug. 3, 2012

(87) PCT Pub. No.: WO2011/096569
PCT Pub. Date: Aug. 11, 2011

(65) Prior Publication Data
US 2012/0319647 A1    Dec. 20, 2012

(30) Foreign Application Priority Data

Feb. 5, 2010   (JP) .................................. 2010-024364

(51) Int. Cl.
*H02J 7/00* (2006.01)
*H02M 3/335* (2006.01)
*H01F 3/10* (2006.01)
*H01F 38/14* (2006.01)

(52) U.S. Cl.
CPC ............. *H02M 3/33553* (2013.01); *H01F 3/10* (2013.01); *H01F 38/14* (2013.01); *H01F 2003/103* (2013.01)

(58) Field of Classification Search
CPC .................................. H02J 7/025; H04B 5/00
USPC .......................................... 320/108; 307/104
See application file for complete search history.

(56) References Cited

U.S. PATENT DOCUMENTS

| | | | |
|---|---|---|---|
| 7,481,895 B2 * | 1/2009 | Iriyama et al. | 148/301 |
| 2009/0121677 A1 * | 5/2009 | Inoue et al. | 320/108 |
| 2009/0212637 A1 * | 8/2009 | Baarman et al. | 307/104 |

FOREIGN PATENT DOCUMENTS

| | | |
|---|---|---|
| JP | 1-157232 A | 6/1989 |
| JP | 11-176677 A | 7/1999 |
| JP | 2008-301553 A | 12/2008 |
| JP | 2009-159660 A | 7/2009 |
| JP | 2009-159677 A | 7/2009 |

OTHER PUBLICATIONS

International Search Report for PCT/JP2011/052564 dated Apr. 5, 2011.
Chinese Office Action dated Dec. 19, 2013 issued by the State Intellectual Property Office of People's Republic of China in Chinese Patent Application No. 201180007508.9.

* cited by examiner

*Primary Examiner* — Drew A Dunn
*Assistant Examiner* — Zixuan Zhou
(74) *Attorney, Agent, or Firm* — Sughrue Mion, PLLC

(57) ABSTRACT

A magnetic circuit for a non-contact charging apparatus comprising a coil, a coil yoke disposed on the rear surface side of the coil, and a magnetic attraction means disposed in a hole of the coil yoke with a magnetic gap in plane and/or thickness directions.

10 Claims, 8 Drawing Sheets

MAGNETIC CIRCUIT, POWER-SUPPLYING DEVICE AND POWER-RECEIVING DEVICE FOR NON-CONTACT CHARGING APPARATUS, AND NON-CONTACT CHARGING APPARATUS

CROSS REFERENCE TO RELATED APPLICATIONS

This application is a National Stage of International Application No. PCT/JP2011/052564 filed Feb. 7, 2011, claiming priority based on Japanese Patent Application No. 2010-024364 filed Feb. 5, 2010, the contents of all of which are incorporated herein by reference in their entirety.

FIELD OF THE INVENTION

The present invention relates to a non-contact charging apparatus capable of surely positioning a secondary coil of a power-receiving device to a primary coil of a power-supplying device without substantially suffering from decrease in power transmission efficiency, and a magnetic circuit, a power-supplying device and a power-receiving device used therein.

BACKGROUND OF THE INVENTION

Recently, small information communications equipments such as mobile phones, etc. are getting high performance and high functions, and web terminals, music players, etc. are required to be continuously usable for a long period of time. These small information communications equipments and electronic equipments use secondary batteries such as lithium ion batteries, etc. as power sources.

Methods for charging secondary batteries include contact charging systems and non-contact charging systems. The contact charging systems are systems of charging electricity by bringing an electrode of a power-receiving device into direct contact with an electrode of a power-supplying device, and have conventionally been used widely because of simple structures, though they need a connection plug adapted to the electrode of power-receiving device and a charging device. The non-contact charging systems comprise a power-supplying device and a power-receiving device each having a coil, conducting power transmission by electromagnetic induction. Because the non-contact charging systems do not need electrodes for the direct contact of a power-supplying device to a power-receiving device, different power-receiving devices can be charged by the same power-supplying device. Also, because the non-contact charging systems do not use corrodible electrodes, they can stably supply and receive electric energy.

In a non-contact charging apparatus, magnetic flux generated by a primary coil acts to generate an electromotive force in a secondary coil via a case of a power-supplying device and a case of a power-receiving device. To improve power transmission efficiency, a coil yoke for preventing the leakage of magnetic flux generated from a coil while charging is disposed on each rear surface of a primary coil and a secondary coil. The leaked magnetic flux flowing through other parts and metal members would cause heat generation by eddy current, and a coil yoke acts as a magnetic shield preventing it. For instance, JP 11-176677 A discloses a non-contact charging apparatus comprising a ferrite core between a secondary coil and circuit parts.

In the case of coreless primary and secondary coils, they should overlap each other in as wide an area as possible to obtain high power transmission efficiency. Accordingly, their center axes should be aligned. For instance, JP 11-176677 A describes that if the center axes of both coils were deviated by a radius of each coil, transmitted power would be zero. For the precise positioning of a power-receiving device to a power-supplying device, there is a system in which a case of a power-supplying device is fitted in a case of a power-receiving device. In this system, however, a power-supplying device should have a power-supplying surface adapted to each power-receiving device, failing to have a common power-supplying device for various power-receiving devices.

JP 2008-301553 A discloses an apparatus for charging a chargeable equipment such as a mobile phone, etc. in a non-contact manner, in which a cradle comprising a primary coil in its case comprises a substantially flat mounting plate having an area enough to mount the chargeable equipment with margin, the mounting plate having a mirror portion including a mark indicating an adaptable range corresponding to a center of the primary coil, the chargeable equipment being positioned on the mounting plate with a center mark reflected by the mirror portion, such that the center mark indicating a center position of a secondary coil in the chargeable equipment is aligned with the adaptable range mark of the mounting plate. In this apparatus, however, each chargeable equipment should be provided with a center mark in advance, undesirable from the viewpoint of design, and the aligning of both marks cannot be conducted in the dark.

JP 2009-159677 A discloses a non-contact charging adapter comprising mounting means constituted by a permanent magnet disposed on a rear side of a power-supplying surface of a power-supplying device, and a permanent magnet disposed on a rear side of a charging surface of a charging device, for positioning a primary coil to a secondary coil by magnetic attraction such that their center axes are aligned. Each mounting means comprises two thin, L-shaped permanent magnets combined such that they annually extend along a periphery of the device. Because each device comprises an annular permanent magnet disposed outside the coil, the arrangement of a coil yoke on a rear side of the coil makes magnetic flux generated from the permanent magnet easily flowable through the coil yoke disposed inside, so that a portion of the coil yoke adjacent to the permanent magnet tends to be magnetically saturated. Because the magnetically saturated portion of the coil yoke has drastically decreased permeability, it fails to act as a yoke sufficiently, resulting in low power transmission efficiency. In addition, the thin, L-shaped permanent magnet is difficult to produce by a rare-earth magnet, and easily broken during handling. If the thin, L-shaped permanent magnet were formed, for instance, by a rubber magnet, sufficient magnetic power would not be obtained, resulting in poor positioning accuracy.

OBJECT OF THE INVENTION

Accordingly, an object of the present invention is to provide a non-contact charging apparatus capable of surely positioning a secondary coil of a power-receiving device to a primary coil of a power-supplying device without substantially suffering from decrease in power transmission efficiency, thereby having excellent usability, and a magnetic circuit, a power-supplying device and a power-receiving device used therein.

DISCLOSURE OF THE INVENTION

The magnetic circuit for a non-contact charging apparatus according to the present invention comprises a coil, a coil yoke disposed on the rear surface side of the coil, and a magnetic attraction means disposed in a hole of the coil yoke with a magnetic gap in plane and/or thickness directions.

The coil yoke preferably has a doughnut plate shape having a center hole, the magnetic attraction means being coaxially disposed in the center hole of the coil yoke.

A front surface of the magnetic attraction means and a front surface of the coil preferably have the same height. Namely, the magnetic attraction means and the coil are disposed preferably as close to a flat power-supplying surface or a flat charging surface as possible.

At least part of the magnetic attraction means is preferably disposed in the center hole of the coil yoke when viewed in a plane direction.

The coil yoke is preferably constituted by one or more roll-quenched, soft-magnetic alloy sheets each having a thickness of 100 μm or less, the total thickness of the soft-magnetic alloy sheets being 200 μm or less.

The magnetic attraction means preferably comprises a disc-shaped permanent magnet, and a circular, cap-shaped, magnetic yoke member having a recess receiving the disc-shaped permanent magnet, the disc-shaped permanent magnet being positioned on the front surface side.

The power-supplying device for a non-contact charging apparatus according to the present invention has the above magnetic circuit.

The power-receiving device for a non-contact charging apparatus according to the present invention has the above magnetic circuit.

The non-contact charging apparatus of the present invention comprises a power-supplying device having the above magnetic circuit, and a power-receiving device having the above magnetic circuit.

DESCRIPTION OF THE PREFERRED EMBODIMENTS

Figure 15:
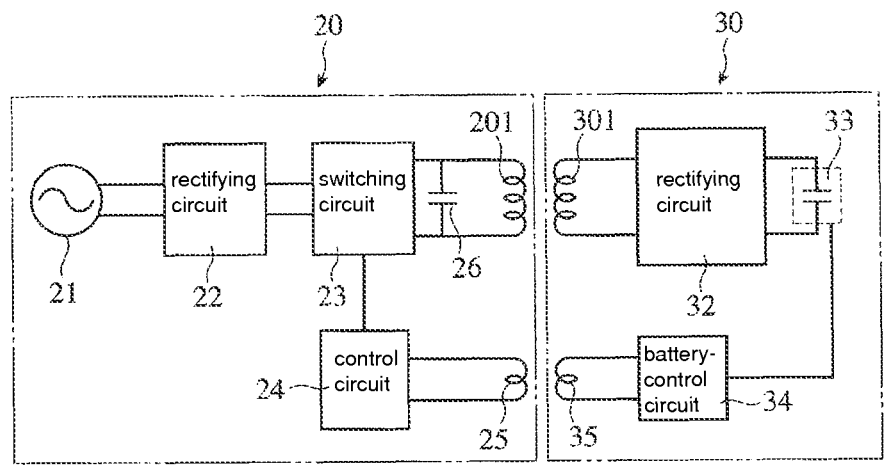
FIG. 15 is a block diagram showing one example of circuits for the non-contact charging apparatus.

A non-contact charging apparatus, to which the present invention is applicable, has a circuit structure shown in FIG. 15. A power-supplying device 20 comprises a power-supplying means 21 for supplying alternating current, a rectifying circuit 22 connected to the power-supplying means 21 for rectifying the alternating current to direct current, a switching circuit 23 inputting the direct current for converting it to high-frequency current having a predetermined frequency, a primary coil 201 connected to the switching circuit 23 such that the high-frequency current passes through it, a resonance capacitor 26 connected in parallel to the primary coil 201 for causing resonance at the same frequency as that of the switching circuit 23, a control circuit 24 connected to the switching circuit 23, and a controlling primary coil 25 connected to the control circuit 24. The control circuit 24 controls the operation of the switching circuit 23 based on induced current obtained from the controlling primary coil 25.

A power-receiving device 30 comprises a secondary coil 301 for receiving magnetic flux generated from the primary coil 201, a rectifying circuit 32 connected to the secondary coil 301, a secondary battery 33 connected to the rectifying circuit 32, a battery-controlling circuit 34 connected to the secondary battery 33 for detecting stored power from the voltage of the secondary battery 33, and a controlling secondary coil 35 connected to the battery-controlling circuit 34. A resonance capacitor (not shown) may be connected in parallel to the secondary coil 301. The rectified current is stored in the secondary battery 33, and used by electronic circuits and driving members (not shown), etc. The battery-controlling circuit 34 provides a signal for optimum charging depending on electric energy stored in the secondary battery 33 to the controlling secondary coil 35. For instance, when the secondary battery 33 is fully charged, a signal for that information is supplied to the controlling secondary coil 35, and then transmitted to the control circuit 24 in the power-supplying device 20 via the controlling primary coil 25 electromagnetically coupled to the controlling secondary coil 35. The control circuit 24 turns off the switching circuit 23 based on the signal.

FIGS. 1-4 show a preferred structure example of the power-supplying devices 20 and the power-receiving devices 30 used in the non-contact charging apparatus. The non-contact charging apparatus comprises the power-supplying device 20 having a magnetic circuit comprising a primary coil 201, a magnetic attraction means 211 and a coil yoke 212, and the power-receiving device 30 having a magnetic circuit comprising a secondary coil 301, a magnetic attraction means 311, and a coil yoke 312. In the power-supplying device 20, surfaces of the primary coil 201, the magnetic attraction means 211 and the coil yoke 212 on the side of a power-supplying surface 203 are called "front surfaces," and their surfaces on the opposite side of the power-supplying surface 203 are called "rear surfaces," for simplicity. Also, in the power-receiving device 30, surfaces of the secondary coil 301, the magnetic attraction means 311 and the coil yoke 312 on the side of a power-receiving surface 303 are called "front surfaces," and their surfaces on the opposite side of the power-receiving surface 303 are called "rear surfaces." Further, the thickness directions of the coils 201, 301, the magnetic attraction means 211, 311 and the coil yokes 212, 312 are simply called "thickness directions."

A case 202 for the power-supplying device 20 comprises upper and lower cases 202a, 202b each formed by a thin, non-magnetic resin plate. The upper case 202a has an upper surface constituting the power-supplying surface 203, and a flat rear surface. Fixed to a center portion of a flat rear surface of the upper case 202a are the magnetic attraction means 211 having a flat front surface, and the primary coil 201 having a flat front surface, which is in a flat spiral form coaxially (concentrically) encircling the magnetic attraction means 211 with a magnetic gap. The term "coaxially" used herein means that a center axis of the magnetic attraction means 211 is aligned with a center axis of the primary coil 201. When both of them are circular, they are concentric. To have high electromagnetic coupling to the secondary coil 301, the primary coil 201 is positioned as close to the power-supplying surface 203 as possible. A magnetic gap between the magnetic attraction means 211 and the primary coil 201 is preferably so large primary that the coil 201 is not substantially influenced by magnetic flux generated from the magnetic attraction means 211. The primary coil 201 in a flat coil form makes the magnetic circuit thin, reducing the height of the power-supplying device. The primary coil 201 may be molded with an insulating resin.

Concentrically adjacent to a rear surface of the primary coil 201 is a doughnut-plate-shaped coil yoke 212 as large as substantially covering the primary coil 201, having an outer diameter larger than that of the primary coil 201 and an inner diameter smaller than that of the primary coil 201, to prevent magnetic flux generated by the primary coil 201 from leaking. When viewed in a thickness direction, the magnetic attraction means 211 is concentrically received in a center hole of the coil yoke 212 with a magnetic gap. Thus, the magnetic attraction means 211 is concentric to the coil yoke 212.

Figure 2:
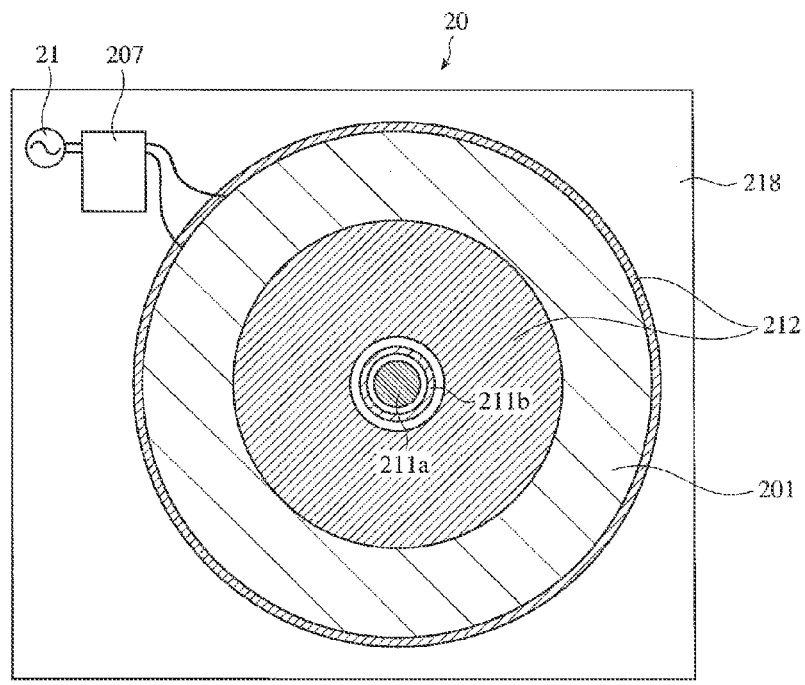
FIG. 2 is a partially cross-sectional plan view showing the structure of a power-supplying device in the non-contact charging apparatus of FIG. 1.
Figure 3:
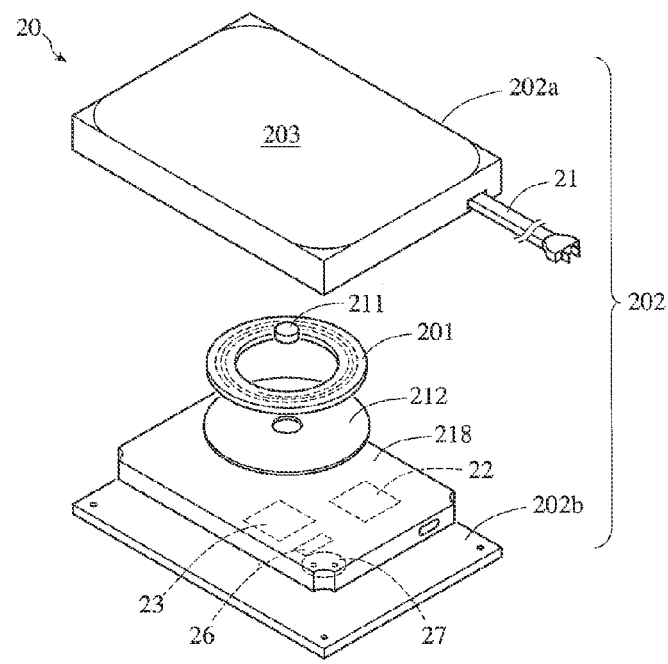
FIG. 3 is an exploded perspective view showing one example of power-supplying devices used in the non-contact charging apparatus of the present invention.

Fixed to an inner surface (upper surface in FIG. 3) of the lower case 202b is a dielectric substrate 218, on which coil terminals 27 to which conductor ends of the primary coil 201 are connected, a resonance capacitor 26, a rectifying circuit 22, a switching circuit 23, etc. are mounted. In FIG. 2, the resonance capacitor 26, the rectifying circuit 22, the switching circuit 23, etc. are summarily shown by 207.

Figure 4:
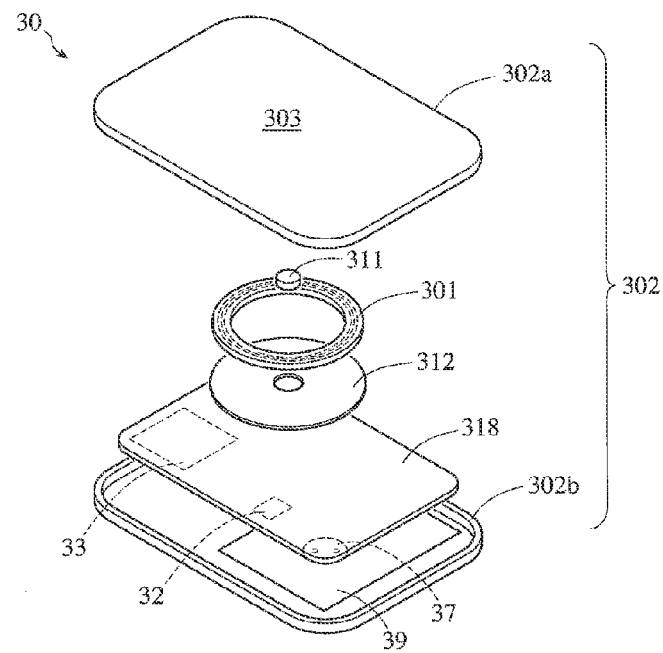
FIG. 4 is an exploded perspective view showing one example of power-receiving devices used in the non-contact charging apparatus of the present invention.

FIG. 4 shows one example of the power-receiving device 30 used in the non-contact charging apparatus. A case 302 for the power-receiving device 30 comprises a lower case 302a formed by a thin flat resin plate having a charging surface 303 brought into contact with the power-supplying surface 203 in the power-supplying device 20 while charging, and an upper case 302b having a liquid-crystal display 39, etc. Fixed to a center portion of a flat rear side of the charging surface 303 are a magnetic attraction means 311 having a flat front surface, and a secondary coil 301 in a flat spiral form having a flat front surface and concentrically encircling the magnetic attraction means 311 with a magnetic gap. The secondary coil 301 is located near the charging surface 303 at a position opposing the primary coil 201. A magnetic gap between the magnetic attraction means 311 and the secondary coil 301 is preferably so large that the secondary coil 301 is not substantially influenced by magnetic flux generated from the magnetic attraction means 311. The secondary coil 301 in a flat coil form makes the magnetic circuit thin, reducing the height of the power-supplying device. The secondary coil 301 may be molded with an insulating resin.

Concentrically adjacent to a rear surface of the secondary coil 301 is a doughnut-plate-shaped coil yoke 312 as large as substantially covering the secondary coil 301, having an outer diameter larger than that of the secondary coil 301 and an inner diameter smaller than that of the secondary coil 301, to prevent magnetic flux generated from the secondary coil 301 from leaking. When viewed in a thickness direction, the magnetic attraction means 311 is concentrically received in a center hole of the coil yoke 312 with a magnetic gap. Thus, the magnetic attraction means 311 is concentric to the coil yoke 312.

Fixed to a rear surface (upper surface in FIG. 4) of the upper case 302b is a dielectric substrate 318, on which coil terminals 37 to which conductor ends of the secondary coil 301 are connected, a rectifying circuit 32, and a secondary battery 33, as well as a driving means (not shown), etc., if necessary. The coil yoke 312 is preferably adjacent to the secondary coil 301, such that magnetic flux generated from the secondary coil 301 does not leak. The substrate 318 may not be fixed to the coil yoke 312.

In both magnetic circuits of the power-supplying device 20 and the power-receiving device 30, the front surfaces of the magnetic attraction means 211, 311 are preferably as high as the front surfaces of the coils 201, 301. Namely, the magnetic attraction means 211, 311 and the transmission coils 201, 301 are preferably positioned near the flat power-supplying surface 203 and the charging surface 303. The secondary coil 301 located on the front surface side is easily electromagnetically coupled to the primary coil 201, providing high power transmission efficiency. The magnetic attraction means 311 located on the front surface side has a large attracting force to the magnetic attraction means 311 in the power-supplying device 20, easily achieving the precise positioning of the power-supplying device 20 to the power-receiving device 30 with a small permanent magnet, thereby reducing the amount of magnetic flux leaking from the magnetic attraction means 311. Thus, a range in which the magnetic saturation of the coil yoke 312 occurs is narrowed, preventing the reduction of its permeability, resulting in high power transmission efficiency.

The primary coil 201 in the power-supplying device 20 may have more number of windings than that of the secondary coil 301 in the power-receiving device 30. The power-supplying device 20, which is not required to be as small as the power-receiving device 30, may comprise a primary coil 201 having a larger number of windings, such that the secondary battery 33 can store electric energy in a short period of time by voltage generated in the secondary coil 301 by mutual induction. The magnetic attraction means 211 may be the same as the magnetic attraction means 311 in the power-receiving device 30.

Soft-magnetic materials used for the coil yoke are preferably roll-quenched ribbons as thick as 100 μm or less of Fe-based, amorphous alloys, Co-based, amorphous alloys, Fe-based, nanocrystalline alloys, Co-based, nanocrystalline alloys, etc. For instance, the Fe-based, or Co-based, nanocrystalline alloys preferably have basic compositions represented by $T_aA_bM_cSi_dB_e$, wherein T is Fe and/or Co, A is Cu and/or Au, M is at least one element selected from the group consisting of Mo, Mn, Cr, Ti, Nb, Ta, W, Al and Sn, and a, b, c, d and e meet the conditions of 65≤a≤80, 0.3≤b≤5, 1≤c≤10, 5≤d≤15, and 5≤e≤15, by atomic %, fine crystal grains having an average diameter of 50 nm or less occupying 50% or more by volume of their structures. The element A is substantially insoluble in Fe, segregated to accelerate the formation of fine crystal clusters. Less than 0.3 atomic % of the element A fails to exhibit its function sufficiently, and more than 5 atomic % of the element A tends to form coarse crystal grains, deteriorating magnetic properties. B and Si are amorphous-forming elements. Because the element M is contained predominantly in an amorphous phase remaining after heat treatment, accelerating the formation of high-Fe-concentration, fine crystal grains, and thus contributing to improvement in soft-magnetic properties. Less than 1 atomic % of the element M fails to exhibit its function sufficiently, and more than 10 atomic % of the element M reduces the saturation magnetic flux densities of the alloys.

Because the non-contact charging apparatus supplies and receives power at a relatively high frequency, thick coil yokes made of a soft-magnetic metal would suffer large eddy current loss, resulting in low power transmission efficiency. Accordingly, these ribbons are as thick as preferably 50 μm or less, more preferably 30 μm or less, most preferably 25 μm or less. To suppress eddy current, the coil yoke may be constituted by laminating pluralities of soft-magnetic ribbons via non-conductive resin layers. Because there is no large demand for making the power-supplying device 20 thinner, the coil yoke may be formed by ferrite having a high saturation magnetic flux density for cost reduction.

Amorphous alloys and nanocrystalline alloys having high permeability in low frequency bands can suppress the leakage of magnetic flux sufficiently. The coil yokes of nanocrystalline alloys are used preferably in frequency bands of 180 kHz or less, particularly 150 kHz or less, and the coil yokes of ferrite are used preferably in frequency bands of more than 180 kHz.

The total thickness of the coil yoke (the total thickness of soft-magnetic sheets in the coil yoke) is preferably 200 μm or less, more preferably 150 μm or less, most preferably 100 μm or less, particularly 50 μm or less. For instance, in the case of mobile equipments such as mobile phones, etc., the coil yoke constituted by laminating two soft-magnetic sheets each as thick as 25 μm or less sufficiently provides the effects of the present invention. Because a coil yoke constituted by thinner soft-magnetic sheets is more easily subject to magnetic saturation near the magnetic attraction means, a magnetic gap is interposed between the coil yoke and the magnetic attraction means to narrow a range in which the coil yoke is magnetically saturated. Particularly, because a magnetic circuit for the non-contact charging apparatus required to have a small height does not have enough space in a thickness direction, a magnetic gap is provided between the coil yoke and the magnetic attraction means preferably in a plane direction rather than in a thickness direction.

To prevent the damage of the power-receiving device and the power-supplying device by fall, impact, etc., a resin sheet may be fixed as a protective sheet to the coil yoke. Taking into consideration heat generation during supplying and receiving power, the resin sheet preferably has high heat resistance. Like the coil yoke, the protective sheet may be in a doughnut plate shape.

Magnetic gaps between the magnetic attraction means 211, 311 and the coil yokes 212, 312 may be voids, or materials having permeability of 10 or less. The width of each magnetic gap is preferably in a range that (a) the function of the yoke to the coil is sufficiently exhibited, and that (b) magnetic saturation near the coil yoke is prevented to suppress decrease in permeability, thereby suppressing the reduction of power transmission efficiency, specifically in a range of 0.1-15 mm. Each magnetic gap as wide as 0.1 mm or more would provide the effect of suppressing the magnetic saturation of the coil yoke sufficiently. The width of each magnetic gap is more preferably 0.3 mm or more, most preferably 0.5 mm or more, particularly 1 mm or more. Each magnetic gap having a width of 15 mm or less would be able to secure a large area for the coil yoke, providing high power transmission efficiency without making the non-contact charging apparatus larger. The upper limit of the width of each magnetic gap is more preferably 10 mm, most preferably 8 mm.

For instance, when the magnetic attraction means 211, 311 are made thicker than the coils 201, 301 to increase their attracting force, at least part of the magnetic attraction means 211, 311 are positioned preferably inside the center holes of the coil yokes 212, 312 in a plane direction, to reduce the height of the magnetic circuits. FIGS. 5(a)-5(f) show various positional relations between the magnetic attraction means 311 and the coil yoke 312, for instance, in the power-receiving device 30. In any cases, the front surface of the magnetic attraction means 311 is on the same plane as the front surface of the coil 301.

Figure 5A:
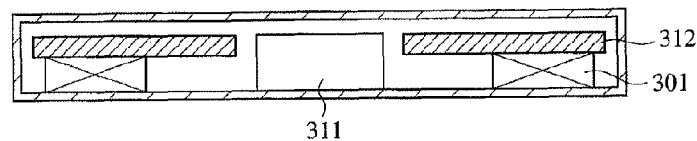
FIG. 5(a) is a schematic, partial cross-sectional view showing one example of positional relations between a magnetic attraction means and a coil yoke.
Figure 5B:
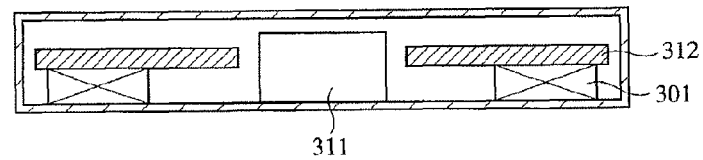
FIG. 5(b) is a schematic, partial cross-sectional view showing another example of positional relations between a magnetic attraction means and a coil yoke.
Figure 5C:
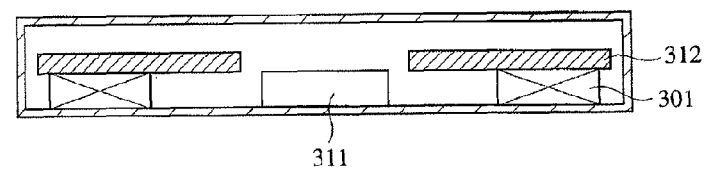
FIG. 5(c) is a schematic, partial cross-sectional view showing a further example of positional relations between a magnetic attraction means and a coil yoke.

FIG. 5(a) shows an example in which the rear surface of the magnetic attraction means 311 is on the same plane as the rear surface of the coil yoke 312. FIG. 5(b) shows an example in which the rear surface of the magnetic attraction means 311 is positioned rearward than the rear surface of the coil yoke 312. As shown in FIGS. 5(a) and 5(b), when the magnetic attraction means 311 is inside or projects rearward from the center hole of the coil yoke 312, magnetic flux tends to easily flow from the rear surface of the magnetic attraction means 311 to the rear surface of the coil yoke 312, resulting in a smaller area of the coil yoke 312 that is magnetically saturated. FIG. 5(c) shows an example in which the rear surface of the magnetic attraction means 311 is on the same plane as the front surface of the coil yoke 312.

Figure 5D:
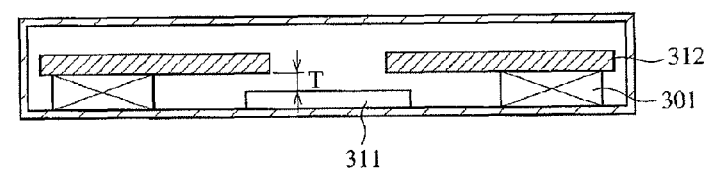
FIG. 5(d) is a schematic, partial cross-sectional view showing a still further example of positional relations between a magnetic attraction means and a coil yoke.

In an example shown in FIG. 5(d), at least part of the magnetic attraction means 311 overlaps the coil yoke 312 when viewed in a thickness direction, while there is a magnetic gap between them when viewed in a plane direction. To prevent the magnetic saturation of the coil yoke 312, the magnetic gap T between the front surface of the magnetic attraction means 311 and the rear surface of the coil yoke 312 is preferably 0.1 mm or more, more preferably 0.2 mm or more, most preferably 0.3 mm or more. To reduce the height of the power-receiving device, the upper limit of the magnetic gap T is preferably 1 mm, more preferably 0.8 mm. When a resin sheet is placed on the front surface of the coil yoke 312, a magnetic gap T may be provided apart from the resin sheet.

Figure 5E:
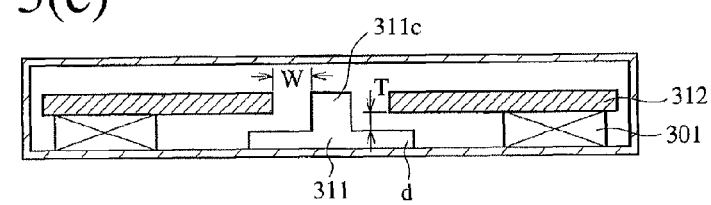
FIG. 5(e) is a schematic, partial cross-sectional view showing a still further example of positional relations between a magnetic attraction means and a coil yoke.

In an example shown in FIG. 5(e), the magnetic attraction means 311 is in the form of a disc d having a center projection 311c, which is received in the center hole of the coil yoke 312 with a magnetic gap W, the disc d overlapping the coil yoke 312 with a magnetic gap T when viewed in a thickness direction. The center projection 311c is preferably circular. With the center projection 311c received in the center hole of the coil yoke 312, magnetic flux easily flows from the projection 311c to the rear surface of the coil yoke 312, resulting in a smaller area of the coil yoke 312 in which magnetic saturation occurs.

Figure 5F:
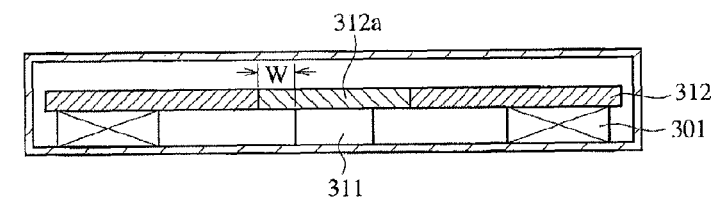
FIG. 5(f) is a schematic, partial cross-sectional view showing a still further example of positional relations between a magnetic attraction means and a coil yoke.

In an example shown in FIG. 5(f), a center hole of the coil yoke 312 is covered with a resin sheet 312a, or at least partially filled with a resin sheet 312a. When the center hole has sufficiently low permeability (for instance, 10 or less), the magnetic saturation of the coil yoke 312 is fully suppressed. When covered with a resin sheet 312a, for instance, at least one side of a hole of the coil yoke 312 formed by roll-quenched, soft-magnetic alloy ribbons is covered with the resin sheet 312a. Covering the center hole with a resin sheet 312a prevents metal powder and dust from entering the magnetic circuit, and increases the mechanical strength of the coil yoke 312. With both sides of the center hole covered with resin sheets 312a, the inside soft-magnetic metal is prevented from rusting.

The magnetic attraction means 311 may be in a shape of circle or polygon such as square, etc. A magnetic circuit having the same structure as described above may of course be used in the power-supplying device 30. In the case of the power-supplying device 20, however, the magnetic attraction means 211 may be deviated from the primary coil 201 upward (toward the power-supplying surface 203); for instance, the rear surface of the magnetic attraction means 211 may be on the same plane as the front surface of the primary coil 201.

Figure 6A:
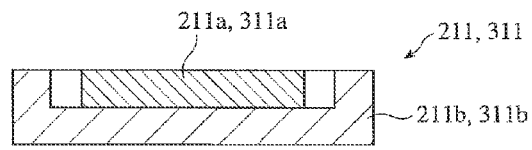
FIG. 6(a) is a cross-sectional view showing one example of the magnetic attraction means.

Each magnetic attraction means 211, 311 is preferably constituted by (a) a disc-shaped permanent magnets 211a, 311a and a magnetic yoke member 211b, 311b made of a soft-magnetic material, (b) only a disc-shaped permanent magnet 211a, 311a, or (c) only a magnetic yoke member 211b, 311b. Each magnetic attraction means 211, 311 shown in FIG. 6(a) comprises a disc-shaped permanent magnets 211a, 311a, and a cap-shaped, magnetic yoke member 211b, 311b open on the front surface side. Each magnetic yoke member 211b, 311b preferably has an open end substantially on the same plane as the front surface of the secondary coil 301. Each magnetic attraction means 211, 311 shown in FIG. 6(b) comprises a disc-shaped permanent magnet 211a, 311a and a disc-shaped magnetic yoke member 211b, 311b. Each magnetic attraction means 211, 311 shown in FIG. 6(c) comprises only a disc-shaped permanent magnet 211a, 311a, and each magnetic attraction means 211, 311 shown in FIG. 6(d) comprises only a disc-shaped magnetic yoke member 211b, 311b. When the magnetic attraction means 211, 311 shown in FIG. 6(d) is used, the magnetic attraction means 211 in the power-supplying device 20 should have a permanent magnet 3. The use of a circular magnetic attraction means preferably provides a uniform magnetic gap between it and a coil yoke, generating a constant attracting force even when the power-receiving device 30 and the power-supplying device 20 are deviated in any directions.

Ferrite magnets, rare-earth magnets, etc. can be used for the permanent magnets 211a, 311a, but NdFeB-based, sintered rare-earth magnets are preferable, taking into consideration the magnetic attracting forces and miniaturization of the power-supplying device 20 and the power-receiving device 30. Preferable for the permanent magnets are magnets anisotropic in thickness directions, which have stronger magnetic attracting forces than those of isotropic magnets, and generate constant attracting forces in any directions that the power-supplying device is in contact with the power-receiving device. Because a permanent magnet magnetized in a thickness direction generates more magnetic flux from the front surface of the magnetic attraction means and less magnetic flux from the side surface (opposite to the coil yoke), the use of the magnetic circuits as shown in FIGS. 5(a) and 5(b) provides a large magnetic attracting force while suppressing the magnetic saturation of the coil yoke. An anti-oxidant coating on a rare-earth magnet is preferably a resin coating rather than a metal plating, taking into consideration the influence of eddy current due to magnetic flux generated from the coils 201, 301.

A resonance capacitor constituting a resonance circuit is connected to preferably at least one, more preferably both, of the primary coil in the power-supplying device and the secondary coil in the power-receiving device. Particularly in a non-contact charging apparatus comprising a coreless coil, the use of a resonance circuit increases the power transmission efficiency. When the charging apparatus comprises a resonance circuit, the coil has a properly adjusted number of windings.

The magnetic yoke members 211b, 311b act to locally concentrate magnetic flux generated from the permanent magnets 211a, 311a to increase a magnetic attracting force between the power-supplying device 20 and the power-receiving device 30, while preventing the magnetic flux generated from the permanent magnets 211a, 311a from flowing to the coil yokes 212, 312. For this purpose, each magnetic yoke member 211b, 311b preferably has a circular cap shape open on the front surface side as shown in FIG. 6(a) rather than a disc shape. Accordingly, when the magnetic attraction means 211, 311 each comprising the permanent magnet 211a, 311a and the magnetic yoke member 211b, 311b are used, the permanent magnets 211a, 311a are preferably located on the front surface side, the magnetic yoke members 211b, 311b being on the rear surface side. The magnetic yoke members 211b, 311b need only be formed by a soft-magnetic material, and are preferably formed by magnetic steel sheets having high saturation magnetic flux densities. The use of the magnetic yoke member 211b, 311b can make the magnetic attraction means thinner than when only the permanent magnet 311a is used.

Both of the power-supplying surface 203 of the power-supplying device 20 and the charging surface 303 of the power-receiving device 30 are preferably flat, and particularly the power-supplying surface 203 of the power-supplying device 30 is preferably flat. With a planar power-supplying surface 203, one power-supplying device 20 can be used for power-receiving devices 30 having various sizes.

When the coil yokes 212, 312 have larger outer diameters than those of the coils 201, 301, improved power transmission efficiency is obtained. However, too large outer diameters of the coil yokes 212, 312 provide large magnetic circuits and saturate the power transmission efficiency. Accordingly, the sizes of the coil yokes 212, 312 are determined depending on the necessary power transmission efficiency, and the sizes of the power-supplying device and the power-receiving device.

Figure 6B:
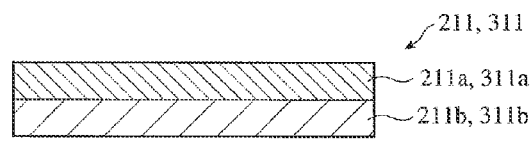
FIG. 6(b) is a cross-sectional view showing another example of the magnetic attraction means.
Figure 6C:
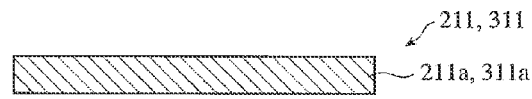
FIG. 6(c) is a cross-sectional view showing a further example of the magnetic attraction means.
Figure 6D:
FIG. 6(d) is a cross-sectional view showing a still further example of the magnetic attraction means.
Figure 7:
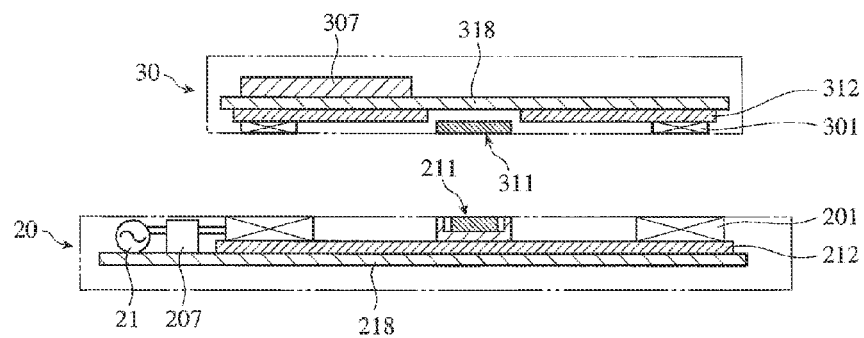
FIG. 7 is a schematic cross-sectional view showing another example of the non-contact charging apparatuses of the present invention.

FIG. 7 shows another example of the non-contact charging apparatuses of the present invention, in which only a coil yoke 312 in a power-receiving device 30 has a doughnut plate shape, while a coil yoke 212 in a power-supplying device 20 has a flat plate shape. In this example, the coil yoke 212 in the power-supplying device 20 can be formed by a relatively thick ferrite plate. In FIG. 7, a rectifying circuit 32, a secondary battery 33, a battery-controlling circuit 34, etc. are summarily shown by 307. A magnetic attraction means 211 may have a structure comprising the permanent magnet 211a shown in FIGS. 6(a)-6(c), and a magnetic attraction means 311 may have a structure comprising only the magnetic yoke member 311b shown in FIG. 6(d). Because demand for thickness reduction is stronger on the power-receiving device 30, only the magnetic attraction means 311 may be formed by a thin magnetic yoke member 311b alone. Also, when the magnetic attraction means comprising only the magnetic yoke member 311b is used only in the power-receiving device 30 containing complicated electric circuits, the stable operation of electric circuits is achieved. Further, the use of a coil yoke 312 made of an amorphous or nanocrystalline alloy only in the power-receiving device 30, and the use of an inexpensive ferrite plate in the power-supplying device 20 are effective for cost reduction.

The present invention will be explained in more detail referring to specific examples below without intention of restriction.

Example 1

Figure 1:
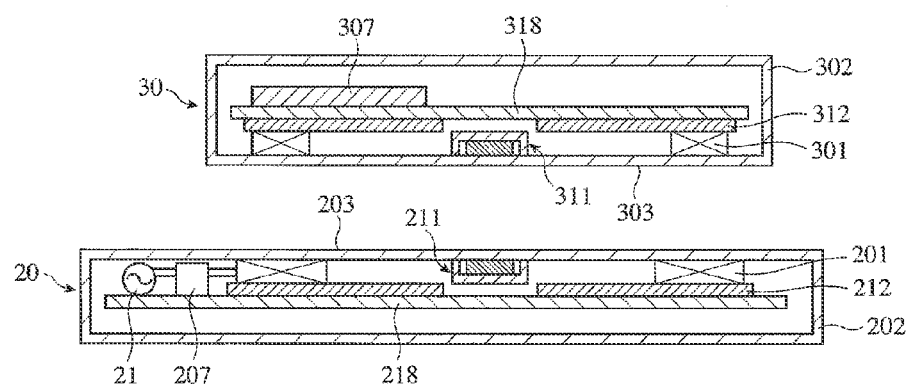
FIG. 1 is a schematic cross-sectional view showing one example of the non-contact charging apparatuses of the present invention.

A non-contact charging apparatus with the structure shown in FIG. 1 having the following dimensions was produced for magnetic analysis.

(1) Power-Supplying Device

A primary coil 201 was concentrically adhered to a doughnut-plate-shaped coil yoke 212, and a magnetic attraction means 211 shown in FIG. 6(a) is disposed concentrically in a center hole of the coil yoke 212 to produce a power-supplying device 20 shown in FIG. 1. The primary coil 201 was formed by 20 turns of a copper wire having a diameter of 0.5 mm, with an inner diameter of 15 mm, an outer diameter of 35 mm and a thickness of 1 mm. The doughnut-plate-shaped coil yoke 212 having an inner diameter of 10 mm and an outer diameter of 40 mm was constituted by laminating two 20-μm-thick, Fe-based, nanocrystalline alloy ribbons ("FINEMET FT1" available from Hitachi Metals Ltd.), both surfaces of which were laminated with 50-μm-thick polyethylene terephthalate (PET) films. The magnetic attraction means 211 was constituted by a cap-shaped, magnetic yoke member 211b having an outer diameter of 8 mm, an inner diameter of 7 mm, a thickness of 0.5 mm and a recess depth of 0.5 mm, a non-magnetic ring having an inner diameter of 6 mm and an outer diameter of 7 mm and fixed in a recess of the magnetic yoke member 211b for forming a magnetic gap, and a disc-shaped permanent magnet 211a having a diameter of 6 mm and a thickness of 0.5 mm and fixed within the non-magnetic ring. The permanent magnet 211a was formed by a resin-coated, NdFeB-based rare-earth magnet ("NEOMAX" (NMX-S36UH) available from Hitachi Metals Ltd., Br=1.2 T). A front surface of the magnetic attraction means 211 and a front surface of the primary coil 201 had the same height.

(2) Power-Receiving Device

A secondary coil 301 was concentrically adhered to a doughnut-plate-shaped coil yoke 312, and a magnetic attraction means 311 shown in FIG. 6(a) was disposed concentrically in a center hole of the coil yoke 312 to produce a power-receiving device 30 shown in FIG. 1. The secondary coil 301 was formed by 10 turns of a copper wire having a diameter of 0.5 mm wire, with an inner diameter of 20 mm, an outer diameter of 30 mm and a thickness of 1 mm. The doughnut-plate-shaped coil yoke 312 having an inner diameter of 10 mm and an outer diameter of 35 mm was constituted by laminating two 20-μm-thick, Fe-based, nanocrystalline alloy ribbons ("FINEMET FT1" available from Hitachi Metals Ltd.), both surfaces of which were laminated with 50-μm-thick PET films. The magnetic attraction means 311 had the same structure as that of the magnetic attraction means 211. A front surface of the magnetic attraction means 311 and a front surface of the secondary coil 301 had the same height.

(3) Magnetic Field Analysis Results

With the power-supplying device 20 and the power-receiving device 30 having cases each as thick as 0.5 mm on the contact surface side, and with 1-mm distance between both magnetic attraction means 211 and 311, magnetic field analysis was conducted. As a result, an attracting force between the magnetic attraction means 211, 311 was 1.1 N, and the power-receiving device 30 had the maximum magnetic flux density of 0.4 T inside the coil yoke 312.

Example 2

Figure 8:
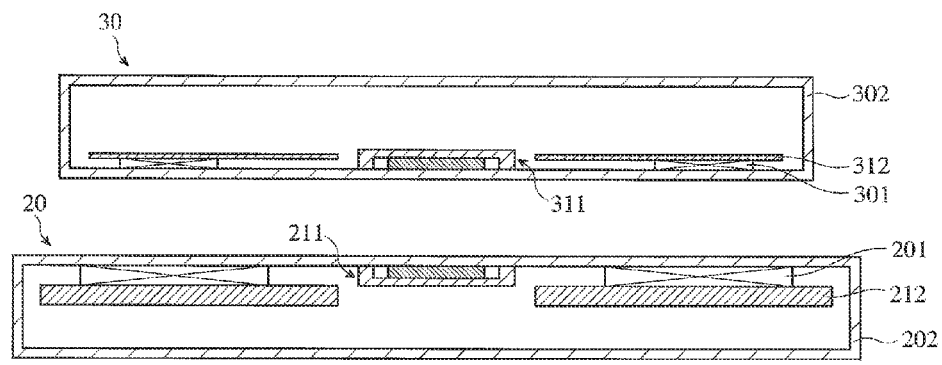
FIG. 8 is a schematic cross-sectional view showing a non-contact charging apparatus used for magnetic field analysis in Example 2.
Figure 9:
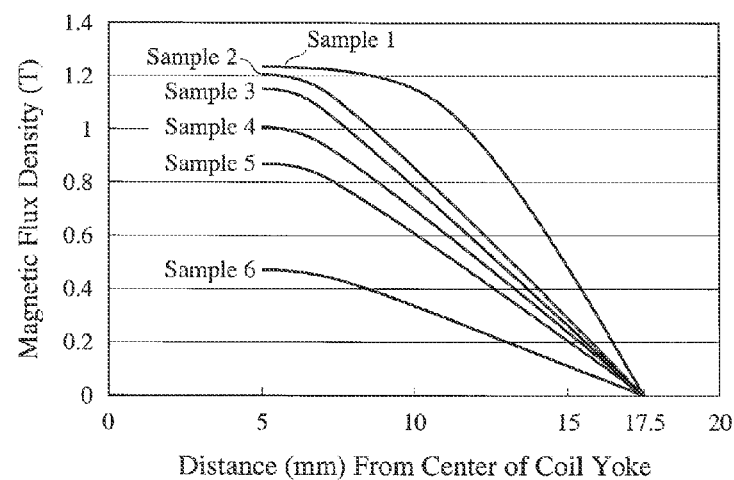
FIG. 9 is a graph showing the relation between the outer diameter of a magnetic attraction means and a magnetic flux density in a coil yoke.

In the non-contact charging apparatus shown in FIG. 8, the relation between the outer diameter of the magnetic attraction means 311 and a magnetic flux density inside the coil yoke 312 was obtained by magnetic field analysis. The primary coil 201 was formed by 16 turns of a copper wire having a diameter of 0.5 mm, with an inner diameter of 17 mm, an outer diameter of 36 mm and a thickness of 1.0 mm, and the secondary coil 301 was formed by 8 turns of a copper wire having a diameter of 0.5 mm wire, with an inner diameter of 22 mm, an outer diameter of 32 mm and a thickness of 0.5 mm. The doughnut-plate-shaped coil yoke 212 having an inner diameter of 10 mm, an outer diameter of 40 mm and a thickness of 1.0 mm was formed by Mn—Zn ferrite. The doughnut-plate-shaped coil yoke 312 having an inner diameter of 10 mm and an outer diameter of 35 mm was constituted by laminating two 20-μm-thick, Fe-based, nanocrystalline alloy ribbons ("FINEMET FT1" available from Hitachi Metals Ltd.) via a 10-μm-thick adhesive sheet. A front surface of the magnetic attraction means 211 and a front surface of the coil 201 had the same height, and a front surface of the magnetic attraction means 311 and a front surface of the coil 301 had the same height. Both magnetic attraction means 211, 311 had the sizes shown in Table 1 and the shapes shown in FIG. 6(a). A rear surface of the magnetic attraction means 211 and a front surface of the coil yoke 212 had the same height, and a thickness-direction center of the magnetic attraction means 311 and a thickness-direction center of the coil yoke 312 had the same height. Magnetic field analysis was conducted under the conditions that current having a frequency of 120 kHz was input at 20° C. The results are shown in FIG. 9.

TABLE 1

| Sample No. | Size of Magnetic Yoke Member (mm) | | | | Size of Permanent Magnet (mm) | | Absorbing Force (N) Between Magnetic Absorption Means |
|---|---|---|---|---|---|---|---|
| | Outer Diameter | Inner Diameter | Thickness | Depth of Recess | Diameter | Thickness | |
| 1 | 10 | 9 | 0.5 | 0.5 | 8 | 0.5 | 3.5 |
| 2 | 7.75 | 6.75 | 0.5 | 0.5 | 5.75 | 0.5 | 1.5 |
| 3 | 7.5 | 6.5 | 0.5 | 0.5 | 5.5 | 0.5 | 1.4 |

TABLE 1-continued

| Sample No. | Size of Magnetic Yoke Member (mm) | | | Depth of Recess | Size of Permanent Magnet (mm) | | Absorbing Force (N) Between Magnetic Absorption Means |
|---|---|---|---|---|---|---|---|
| | Outer Diameter | Inner Diameter | Thickness | | Diameter | Thickness | |
| 4 | 7.25 | 6.25 | 0.5 | 0.5 | 5.25 | 0.5 | 1.3 |
| 5 | 7 | 6 | 0.5 | 0.5 | 5 | 0.5 | 1.1 |
| 6 | 6 | 5 | 0.5 | 0.5 | 4 | 0.5 | 0.7 |

In Sample 1, in which the outer diameter of the magnetic yoke member was the same as the diameter of the center hole of the coil yoke 312, and there was no magnetic gap between the magnetic attraction means and the coil yoke 312, a portion of the coil yoke 312 adjacent to the magnetic attraction means was saturated (reaching about 1.2 T equal to the saturation magnetic flux density of the Fe-based, nanocrystalline alloy), so that the coil yoke 312 failed to act as a yoke even if magnetic flux was added. As a result, the non-contact charging apparatus exhibited low power transmission efficiency.

On the other hand, in Samples 2-6 each having a magnetic gap between the magnetic attraction means and the inner surface of the center hole of the coil yoke 312, the coil yoke 312 had a lower magnetic flux density than in Sample 1, so that the coil yoke 312 was protected from being magnetically saturated. A larger magnetic gap provided a lower magnetic flux density in the coil yoke 312. The suppressed decrease of the permeability of a coil yoke provides the non-contact charging apparatus with improved power transmission efficiency. Because a magnetic flux density in the coil yoke varies depending on a magnetic gap, a permanent magnet for the magnetic attraction means, etc., their sizes should be optimized.

Example 3

Figure 10:
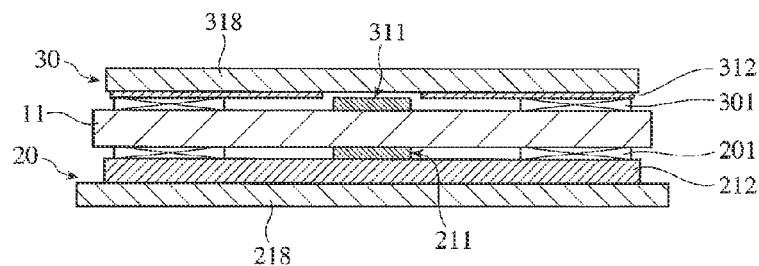
FIG. 10 is a schematic cross-sectional view showing a non-contact charging apparatus used for the measurement of power transmission efficiency in Example 3.

A non-contact charging apparatus shown in FIG. 10 was investigated with respect to the relation between a magnetic gap width between a magnetic attraction means and a coil yoke and the power transmission efficiency of the non-contact charging apparatus.

(1) Power-Supplying Device

A coil yoke 212 formed by a ferrite disc having an outer diameter of 40 mm and a thickness of 1 mm was fixed onto a resin substrate 218. Concentrically disposed on the coil yoke 212 as a primary coil 201 was a resin-coated flat coil having an outer diameter of 40 mm, an inner diameter of 20 mm and a thickness of 0.5 mm and comprising 16 turns of a copper wire having a diameter of 0.5 mm. As a magnetic attraction means 211, a disc-shaped permanent magnet (surface magnetic flux density=150 mT) having an outer diameter of 15 mm and a thickness of 0.5 mm was disposed concentrically with the primary coil 201. A front surface of the magnetic attraction means 211 and a front surface of the coil 201 had the same height.

(2) Power-Receiving Device 3-layer, 6-layer, and 9-layer, doughnut-plate-shaped coil yokes 312 were produced by laminating 18-μm-thick, Fe-based, nanocrystalline alloy ribbons ("FINEMET FT3" available from Hitachi Metals Ltd.) via 10-μm-thick adhesive sheets. Each coil yoke 312 was fixed to a 3-mm-thick aluminum alloy substrate 318. The outer diameters and inner diameters of the coil yokes 312 are shown in Table 2 together with their numbers of layers.

TABLE 2

| Coil Yoke 312 | | | | | | |
|---|---|---|---|---|---|---|
| Number of Layers | Outer Diameter (mm) | Inner Diameter (mm) | | | | |
| 3 | 40 | 15 | 20 | 25 | 30 | 35 |
| 6 | 40 | 15 | 20 | 25 | 30 | — |
| 9 | 40 | 15 | 20 | 25 | 30 | — |

Figure 11:
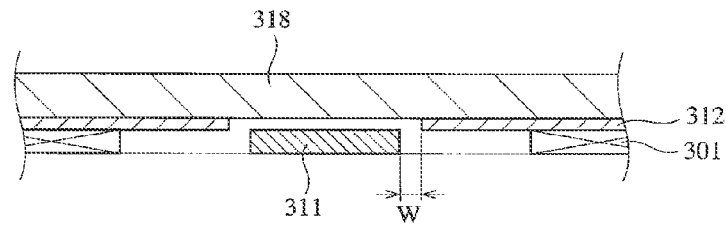
FIG. 11 is a partial, enlarged view of FIG. 10.

As a secondary coil 301, a resin-coated flat coil having an outer diameter of 40 mm, an inner diameter of 20 mm and a thickness of 0.5 mm and comprising 8 turns of a copper wire having a diameter of 0.5 mm was used. As a magnetic attraction means 311, a soft-magnetic, cold-rolled steel disc having a diameter of 15 mm and a thickness of 0.5 mm was displaced concentrically with the coil yoke 312. The magnetic attraction means 311 was fixed to a resin plate 11, such that a front surface of the magnetic attraction means 311 and a front surface of the secondary coil 301 had the same height. FIG. 11 enlargingly shows a magnetic gap W between an outer peripheral surface of the magnetic attraction means 311 and an inner peripheral surface of the center hole of the coil yoke 312 in the power-receiving device 30.

(3) Measurement of Power Transmission Efficiency

Figure 12:
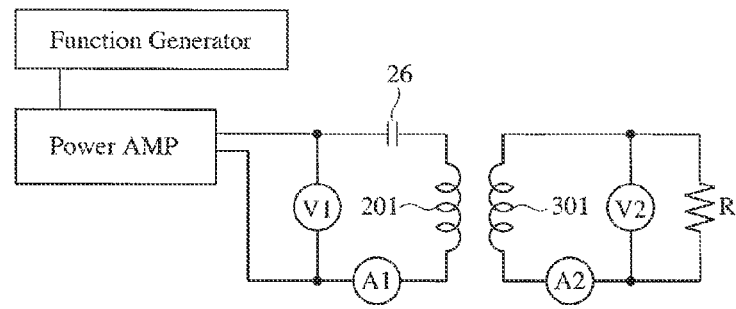
FIG. 12 is a block diagram showing a circuit used for the measurement of power transmission efficiency.

A primary coil 201 and a secondary coil 301 coaxially opposing via a 1.5-mm-thick resin plate 11 were connected to a measurement apparatus as shown in FIG. 12. The capacitance of a resonance capacitor 26 was adjusted to make the primary coil 201 and the secondary coil 301 resonant. Current having a frequency of 120 kHz was input to the primary coil 201 in a power-supplying device 20 at 20° C., to determine power transmission efficiency by the following equation. The results are shown in FIG. 13.

Power transmission efficiency $P=(V2 \times A2)/(V1 \times A1)$, wherein V1 is voltage between both terminals of a series resonance circuit comprising the primary coil 201 and the resonance capacitor 26, A1 is current flowing through the primary coil 201, V2 is voltage between both terminals of the secondary coil 301, and A2 is current flowing through the secondary coil 301.

Figure 13:
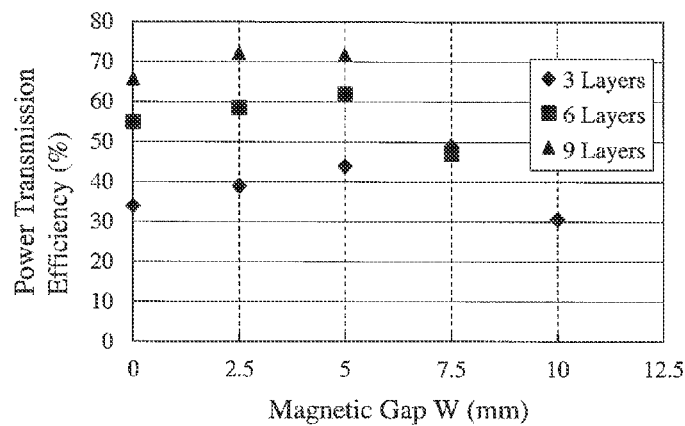
FIG. 13 is a graph showing the relation between a magnetic gap and power transmission efficiency.

As is clear from FIG. 13, the maximum power transmission efficiency was obtained with a magnetic gap W larger than 0 mm. Because a larger-diameter center hole of the coil yoke 312 provides a larger magnetic gap W and a smaller area of the coil yoke 312, it is expected that the power transmission efficiency decreases. It has been found, however, that the existence of a magnetic gap between the magnetic attraction means 311 and the coil yoke 312 rather increases the power transmission efficiency. This tendency is appreciated when the magnetic attraction means shown in FIGS. 6(*a*), 6(*b*) and 6(*c*) are used.

In any coil yokes 312, larger power transmission efficiency P was obtained as the total thickness of Fe-based, nanocrystalline alloy ribbons increased. Specifically, the power transmission efficiency P of a 9-layer coil yoke 312 (the total thickness of Fe-based, nanocrystalline alloy ribbons: 150 μm or more) was 8% or more larger when the magnetic gap W was 2.5 mm and 5 mm than when the magnetic gap W was 0 mm. The power transmission efficiency P of a 6-layer coil yoke 312 (the total thickness of Fe-based, nanocrystalline alloy ribbons: 100 μm or more) was 10% or more larger when the magnetic gap W was 5 mm than when the magnetic gap W was 0 mm. The power transmission efficiency P of a 3 layer coil yoke 312 (the total thickness of Fe-based, nanocrystalline alloy ribbons: 50 μm or more) was 10% or more larger when the magnetic gap W was 2.5 mm, 5 mm and 7.5 mm than when the magnetic gap W was 0 mm. Particularly the power transmission efficiency P was 20% or more larger when the magnetic gap W was 7.5 mm than when the magnetic gap W was 0 mm.

Example 4

When the power-supplying device 20 and the power-receiving device 30 in the non-contact charging apparatus shown in FIG. 8 had magnetic attraction means 211, 311 for positioning, and when they did not have, the power transmission efficiency was obtained by magnetic field analysis. Used as the magnetic attraction means 211, 311 were those in Sample 2 shown in Table 1. Current having a frequency of 120 kHz was input to the primary coil 201 in the power-supplying device 20 at 20° C. to measure V1, V2, A1 and A2 by the apparatus shown in FIG. 12, from which the power transmission efficiency was calculated by the same equation as in Example 3.

While the power transmission efficiency was 89.0% without the magnetic attraction means, it was 88.6% when the magnetic attraction means was used. Though a permanent magnet and a metal-made, magnetic yoke member used in the magnetic attraction means decrease the power transmission efficiency, it has been found that their influence is extremely small because the coil yoke and the coil are disposed with a magnetic gap.

Example 5

Figure 14:
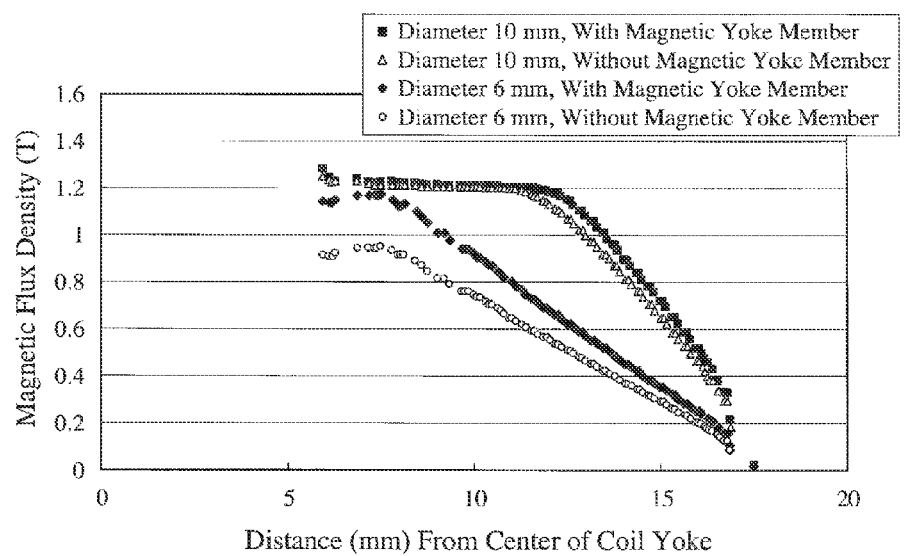
FIG. 14 is a graph showing the relation between the distance from the center of a coil yoke and a magnetic flux density in a coil yoke.

In the power-supplying device 20 and the power-receiving device 30 having the structures shown in FIG. 8, the magnetic attraction means 211, 311 shown in FIG. 6(b), which had an outer diameter of 10 mm, and the magnetic attraction means 211, 311 shown in FIG. 6(c), which had an outer diameter of 6 mm, were used to investigate the relation between the distance from a center of the center hole (radius: 5 mm) of the coil yoke 312 in the power-receiving device 30 and a magnetic flux density in the coil yoke 312, by magnetic field analysis. The results are shown in FIG. 14.

When the outer diameter of each magnetic attraction means was 10 mm, the coil yoke was partially magnetically saturated because each magnetic attraction means was in contact with the coil yoke. On the other hand, when the outer diameter of each magnetic attraction means was 6 mm, the coil yoke was not saturated because there was a magnetic gap of 2 mm between the coil yoke and the magnetic attraction means. Also, a larger magnetic flux density in the coil yoke, and thus a higher magnetic attracting force were obtained in the magnetic attraction means shown in FIG. 6(a), which comprised a permanent magnet and a magnetic yoke member, than in the magnetic attraction means shown in FIG. 6(c), which comprised only a permanent magnet. With a smaller permanent magnet, a smaller magnetic flux density was obtained in the coil yoke.

Although the present invention has been explained in detail referring to the attached drawings, it is not restricted to them, but various modifications may be made within the scope of the present invention. For instance, the primary coil and the secondary coil are not restricted to be circular as shown in the drawings, but may be polygonal such as rectangular. Depending on the coil shape, the coil yoke may have a polygonal doughnut shape. Also, the magnetic attraction means is not restricted to be circular, but may be polygonal such as square, etc. The windings of the primary coil and the secondary coil may have single or multi layers in a thickness direction. The coil is not restricted to a wound copper wire, but may be a printed coil. Further, though explanation has been made on a coil yoke having a center hole, the present invention is not restricted thereto. The coil yoke may be, for instance, a square coil yoke having corners each provided with a hole, in which a magnetic attraction means is disposed.

Effect of the Invention

Because the magnetic circuit for the non-contact charging apparatus of the present invention comprises a magnetic attraction means coaxially disposed in a center hole of a doughnut-plate-shaped coil yoke with a magnetic gap, it can surely position a center axis of a secondary coil in a power-receiving device to a center axis of a primary coil in a power-supplying device while preventing decrease in power transmission efficiency, despite its simple structure. Also, because the non-contact charging apparatus of the present invention has a structure in which a small magnetic attraction means is disposed at a center of a center hole of a coil yoke, it has excellent usability with one power-supplying device usable for various power-receiving devices. The non-contact charging apparatuses of the present invention having such features are suitable for mobile phones, mobile music players, mobile information terminals, small personal computers, small, mobile, electronic gears such as wristwatches having electronic circuits, small electronic gears such as electric tooth brushes and remote controls, etc.

What is claimed is:

1. A magnetic circuit for a non-contact charging apparatus, comprising:
   a coil;
   a coil yoke disposed on the rear surface side of said coil; and
   a magnetic attraction member,
   wherein at least a part of said magnetic attraction member is disposed in a hole of said coil yoke when viewed in a plane direction, and
   wherein a magnetic gap is interposed between the magnetic attraction member and the coil yoke in at least one of the plane direction and a thickness direction,
   wherein a width of the magnetic gap is in a range such that magnetic saturation near the coil yoke is prevented to suppress decrease in permeability, thereby suppressing reduction of power transmission efficiency, and further the coil is not substantially influenced by magnetic flux generated from the magnetic attraction member.

2. The magnetic circuit for a non-contact charging apparatus according to claim 1, wherein said coil yoke has a doughnut plate shape having a center hole as said hole, and wherein said magnetic attraction member is coaxially disposed in the center hole of said coil yoke.

3. The magnetic circuit for a non-contact charging apparatus according to claim 1, wherein a front surface of said magnetic attraction member and a front surface of said coil extend to the same height.

4. The magnetic circuit for a non-contact charging apparatus according to claim 1, wherein said coil yoke is constituted by one or more roll-quenched, soft-magnetic alloy sheets each having a thickness of 100 μm or less, the total thickness of said soft-magnetic alloy sheets being 200 μm or less.

5. The magnetic circuit for a non-contact charging apparatus according to claim 1, wherein said magnetic attraction member comprises a disc-shaped permanent magnet and a circular, cap-shaped, magnetic yoke member having a recess receiving said disc-shaped permanent magnet, said disc-shaped permanent magnet being positioned on a front surface side of said circular, cap-shaped magnetic yoke member.

6. A power-supplying device for a non-contact charging apparatus, comprising the magnetic circuit recited in claim 1.

7. A power-receiving device for a non-contact charging apparatus, comprising the magnetic circuit recited in claim 1.

8. A non-contact charging apparatus comprising the power-supplying device recited in claim 6.

9. A non-contact charging apparatus comprising the power-receiving device recited in claim 7.

10. The magnetic circuit of claim 1, wherein the width of the magnetic gap is in the range of 0.1 to 15 mm.

* * * * *